United States Patent [19]
Lenoir et al.

[11] 3,931,142
[45] Jan. 6, 1976

[54] HETEROCYCLIC CONTAINING DISAZO COMPOUNDS

[75] Inventors: John Lenoir; Paul Tschopp, both of Marly-le-Petit; Hansrolf Loeffel, Bern; de Montmollin: Rene, Riehen, all of Switzerland

[73] Assignee: Ciba-Geigy AG, Basel, Switzerland

[22] Filed: Oct. 23, 1973

[21] Appl. No.: 408,769

[30] Foreign Application Priority Data
Sept. 23, 1971  Switzerland................14136/70

Related U.S. Application Data

[62] Division of Ser. No. 183,244, Sept. 23, 1971, abandoned.

[52] U.S. Cl.............. 260/156; 260/152; 260/153; 260/154; 260/172; 260/173; 260/174; 260/175; 260/177; 260/187; 260/198; 260/199; 96/99
[51] Int. Cl.².................................... C07C 107/04
[58] Field of Search............ 260/152, 153, 154, 156

[56] References Cited
UNITED STATES PATENTS

| 3,443,952 | 5/1969 | Anderall.................. 260/152 X |
| 3,555,004 | 6/1971 | Mueller et al................. 260/152 X |

*Primary Examiner*—Charles F. Warren
*Attorney, Agent, or Firm*—Joseph G. Kolodny; Edward McC. Roberts; Prabodh I. Almaula

[57] ABSTRACT

Polyazo dyestuffs of the formula

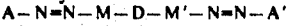

wherein A and A' each represents a 2(8)-amino-8(2)-hydroxynaphthalene radical further substituted with a sulphonic acid group, M and M' each represents a substituted 1,4- or 1,3-phenylene radical and D represents an organic radical bonded in the manner of an amide to M and M', said dyestuffs containing at least two sulphonic acid groups in the molecule, as well as photographic material containing in at least one layer a polyazo dyestuff of the above formula are described.

14 Claims, No Drawings

HETEROCYCLIC CONTAINING DISAZO COMPOUNDS

This is a divisional of application Ser. No. 183,244, filed on Sept. 23, 1971, now abandoned.

The subject of the invention are polyazo dyestuffs of the formula $$A-N=N-M-D-M'-N=N-A' \quad (1)$$

wherein A and A' each denote a naphthalene radical which in the 1- or 2-position contains the azo group, in the 2- or 8-position contains an optionally substituted amino group, in the 8- or 1-position contains a hydroxyl group, in the meta-position to the hydroxyl group contains a sulphonic acid group and optionally contains a sulphonic acid group in the amine-substituted ring, M and M' each denote a 1,4- or 1,3-phenylene radical which is substituted by $-CF_3$, $-CN$, $-SO_2T$ or

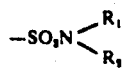

and optionally additionally by lower alkyl, lower alkoxy or halogen, with T denoting optionally substituted alkyl, cycloalkyl, aralkyl or aryl, $R_1$ denoting hydrogen or optionally substituted alkyl, cycloalkyl, aralkyl or aryl and $R_2$ denoting hydrogen or optionally substituted alkyl, or $R_1$ and $R_2$ together forming the supplement to a heterocyclic 5-membered or 6-membered ring, and D denotes an organic radical bonded in the manner of an amide to M and M', and the dyestuffs contain at least two sulphonic acid groups in the molecule.

Possible substituents optionally present in T, $R_1$ and $R_2$ are, for example, halogen atoms or hydroxyl, carboxylic acid, sulphonic acid or lower alkoxy radicals.

If the amino group in the 2- or 8-position of the naphthalene radical is substituted, the substituents are as a rule acyl, phenyl or alkyl radicals which are optionally further substituted.

By polyazo dyestuffs, dyestuffs with, preferably, 2 or 3 azo components are to be understood in the present text.

Preferably, these polyazo dyestuffs correspond to the formula $$(2) A_1-N=N-M-D-M'-N=N-A_1'$$

wherein $A_1$ and $A_1'$ each represent the radical

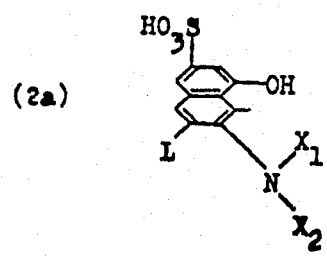

wherein Q denotes hydrogen or an acyl radical derived from an optionally substituted aliphatic, aromatic or heterocyclic carboxylic acid or an optionally substituted aliphatic or aromatic sulphonic acid, $X_1$ denotes hydrogen, optionally substituted lower alkyl or optionally substituted phenyl, $X_2$ denotes hydrogen or optionally substituted lower alkyl and L denotes hydrogen or a sulphonic acid group, and M, M' and D have the indicated meanings.

D can thus be an aliphatic, aromatic or heterocyclic radical which is bonded in the manner of an amide to M and M', or can be the diamide radical of carbonic acid or oxalic acid. Radicals D bonded in the manner of an amide hence correspond, for example, to the following formulae:

3a. $-HN-CO-NH-$
3b. $-HN-CO-CO-NH-$
3c. $-HN-CO-D'-CO-NH-$
3d. $-HN-CO-D'-NH-CO-$
3e. $-CO-HN-D'-NH-CO-$
3f. $-SO_2-HN-D'-NH-SO_2-$
3g. $-HN-SO_2-D'-SO_2-NH-$ or
3h. $-HN-D''-NH-$

D' here represents an organic radical of the indicated type and D'' denotes a heterocyclic radical of acid character, such as, for example, a cyanuric acid radical.

The lower alkyl or alkoxy radicals present as substituents as a rule contain at most 4 carbon atoms. Methyl and methoxy are in most cases preferred.

Where halogen atoms occur as substituents, they are fluorine, iodine or above all bromine and especially chlorine.

Phenyl or alkyl radicals which are substituted further contain, for example, alkoxy, lower alkyl, lower alkylsulphonyl, lower alkylcarbonyl, carboxylic acid or sulphonic acid groups, hdyroxyl groups or halogen atoms, as in the case of trifluoromethyl group.

The dyestuffs of the Formula (1) and (2) can be asymmetrical or preferably symmetrical.

However, polyazo dyestuffs of particular interest are those of the formula (4) 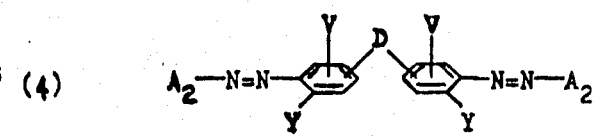

wherein $A_2$ denotes the radical (4a) 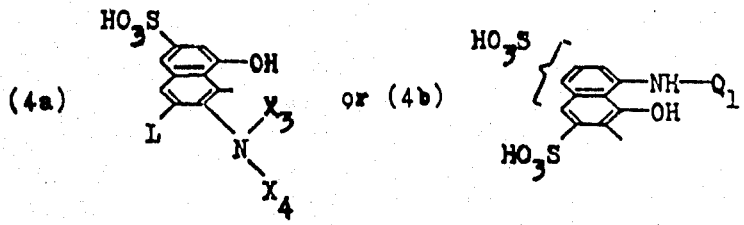

wherein $Q_1$ denotes hydrogen or an acyl radical which is derivied from an aliphatic, heterocyclic or optionally substituted aromatic carboxylic acid or from an optionally substituted aromatic aliphatic acid, $X_3$ denotes hydrogen, lower alkyl or optionally substituted phenyl, $X_4$ denotes hydrogen or lower alkyl, Y denotes $-CF_3$, $-CN$, $-SO_2T_1$ or

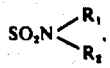

wherein $T_1$ denotes a lower alkyl, phenyl or lower alkylphenyl radical which is optionally substituted by hydroxyl, carboxylic acid or sulphonic acid and V denotes hydrogen, lower alkyl, lower alkoxy or halogen, $R_1$, $R_2$, or sulphonic acid or phenyl optionally substituted by sulphonic acid, carboxylic acid, lower alkyl, lower alkoxy or halogen, $R_4$ denotes hydrogen or an alkyl radical optionally substituted by hydroxyl, and $R_3$ and $R_4$ together denote an alkylene radical with 4 or 5 carbon atoms or a radical of the formula 5a. $-(CH_2)_2 - Z - (CH_2)_2 -$ wherein Z represents $-O-$, $-NH-$ or $-N(CH_3)-$, and $D_1$ denotes a diamide radical of an at least dibasic carbon-containing organic acid, preferably carboxylic acid, which is bonded to the two adjacent benzene radicals by the amide nitrogen atoms, and wherein $A_2$ has the indicated meaning.

Polyazo dyestuffs of particular importance are those of the formula (6) 

D and L have the indicated meaning, and V is preferably in the p-position relative to Y.

Advantageous properties are also displayed, above all, by polyazo dyestuffs of the formula wherein $A_3$ represents the radical (6a) or (6b) 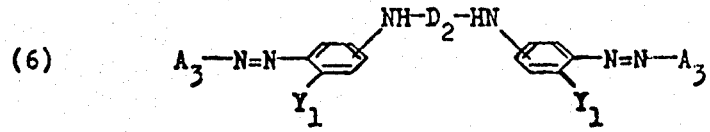

wherein $Q_2$ denotes an acyl radical which is derived from an optionally substituted benzenecarboxylic or benzenesulphonic or pyridinecarboxylic acid, $X_5$ denotes hydrogen or optionally substituted phenyl and $D_2$ denotes a carbonyl radical or a heterocyclic or carbocyclic aromatic dicarbonyl radical and L and $Y_1$ have the indicated meaning.

Suitable polyazo dyestuffs of the Formula (6), wherein $A_3$ is the radical (6a), correspond, for example, to the formula (5) 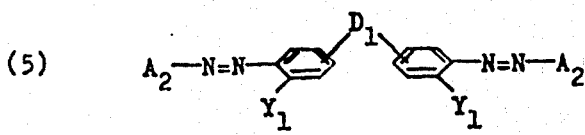

wherein $Y_1$ denotes $-CF_3$, $-CN$, $-SO_2T_2$ or (7) 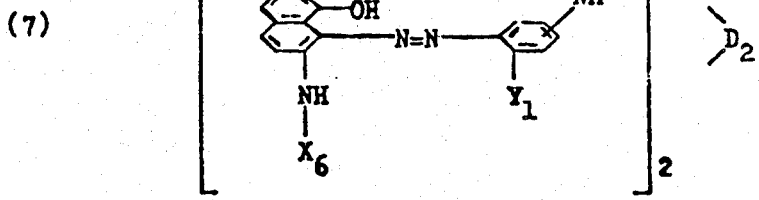

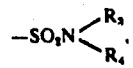

wherein $T_2$ denotes a methyl, phenyl or 4-methyl-3-sulpho-phenyl radical, $R_3$ denotes hydrogen, a lower alkyl radical optionally substituted by hydroxyl, lower alkoxy wherein $X_6$ denotes hydrogen or phenyl optionally substituted by lower alkyl, lower alkoxy, halogen, sulphonic acid, lower alkylsulphonyl or lower alkylcarbonyl, or hydrogen (sic) and $Y_1$ and $D_2$ have the indicated meaning.

Amongst these polyazo dyestuffs, those of the formula (8)
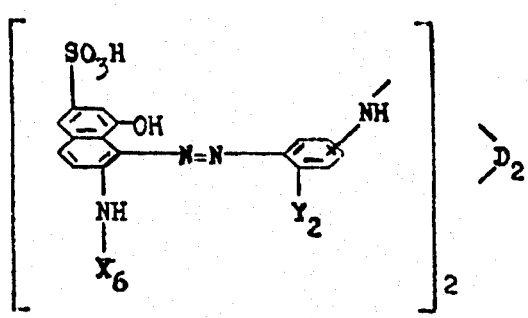

are preferred wherein $Y_2$ represents $-CF_3$, $-CN$, $-SO_2T_3$ or

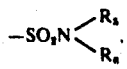

wherein $T_3$ denotes methyl or 4-methyl-3-sulphophenyl, $R_5$ denotes hydrogen, methyl, ethyl, hydroxyethyl, sulphoethyl, sulphopropyl or phenyl optionally substituted by lower alkyl, lower alkoxy, carboxylic acid or sulphonic acid, and $R_6$ denotes hydrogen, methyl or hydroxyethyl, and $D_2$ and $X_6$ have the indicated meaning.

Here, polyazo dyestuffs in the forefront of interest are those of the formula (9)
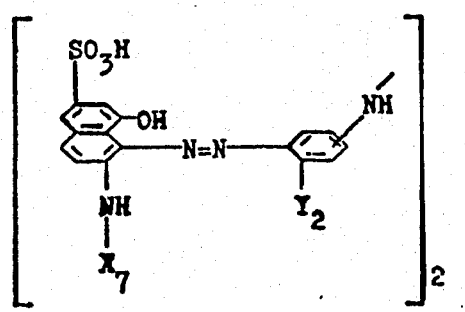

wherein $X_7$ denotes hydrogen or a radical of the formula (9a)
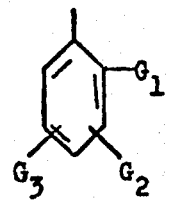

wherein $G_1$ denotes hydrogen, methyl or methoxy, $G_2$ denotes chlorine, methyl, methoxy, methylsulphonyl or sulphonic acid and $G_3$ denotes hydrogen or methyl, and $D_3$ denotes carbonyl, terephthaloyl, isophthaloyl, benzophenone-4,4'- or 3,4'-dicarbonyl, diphenylsulphone-4,4'- or 3,4'-dicarbonyl, diphenylurea-4,4 - or 3,3'-dicarbonyl, azobenzene-3,3'-dicarbonyl, thiophene-2,5-dicarbonyl, pyridine-2,6-dicarbonyl, pyridine-2,4-dicarbonyl, pyridine-2,5-dicarbonyl or pyridine-3,5-dicarbonyl and $Y_2$ has the indicated meaning.

Very particularly preferred polyazo dyestuffs of this nature correspond to the formula

(10)
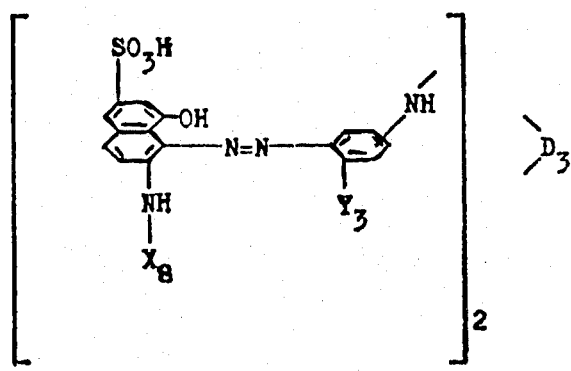

wherein $R_6$ and $D_3$ have the indicated meanings, $Y_3$ represents $-CF_3$, $-CN$, $-SO_2CH_3$,

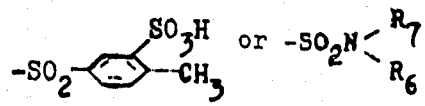

wherein $R_7$ denotes hydrogen, methyl, hydroxyethyl, sulphoethyl or phenyl, and $X_8$ denotes hydrogen or the 2,6-dimethylphen-(1)-yl radical.

In the polyazo dyestuffs of the Formulae (6) to (10) the $-NH-$ group is preferably in the p-position to the azo group in the benzene radical.

Amongst the dyestuffs of the Formula (10), these of the formula

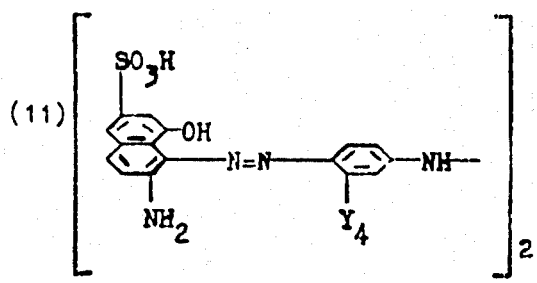

wherein $Y_4$ denotes

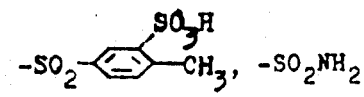

or $-SO_2N+CH_2CH_2OH)_2$ and $D_4$ denotes carbonyl, terephthaloyl, isophthaloyl, pyridine-2,6-dicarbonyl or azobenzene-3,3'-dicarbonyl, are above all outstanding.

As particularly suitable types of polyazo dyestuffs of the Formulae (1), (2) and (4) to (11) there may be mentioned:

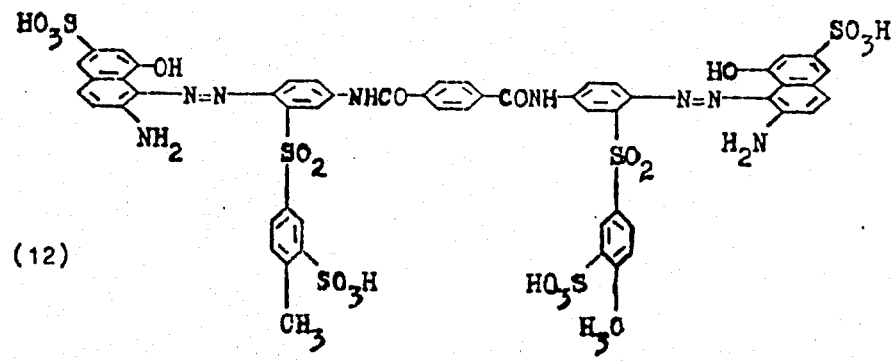

(12)

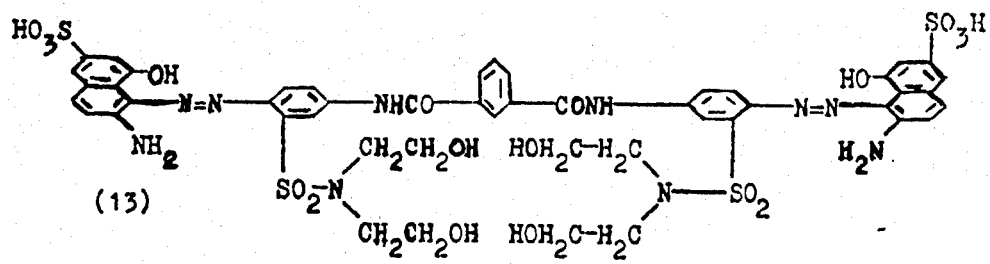

(13)

[Dyestuff (102) of Table I]

and

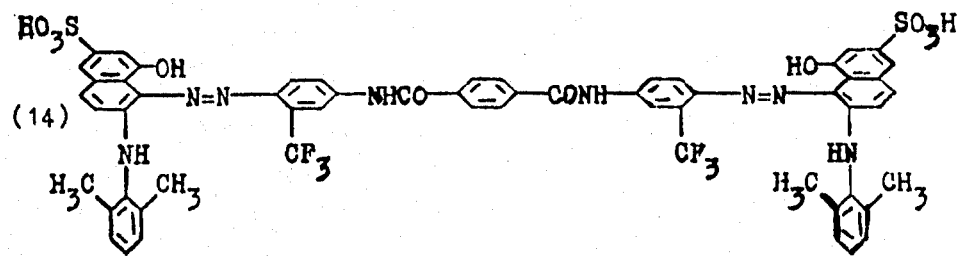

(14)

[= Dyestuff (204) of Table II]

Polyazo dyestuffs of the Formula (6), wherein $A_3$ is the radical (6b) preferably correspond to the formula

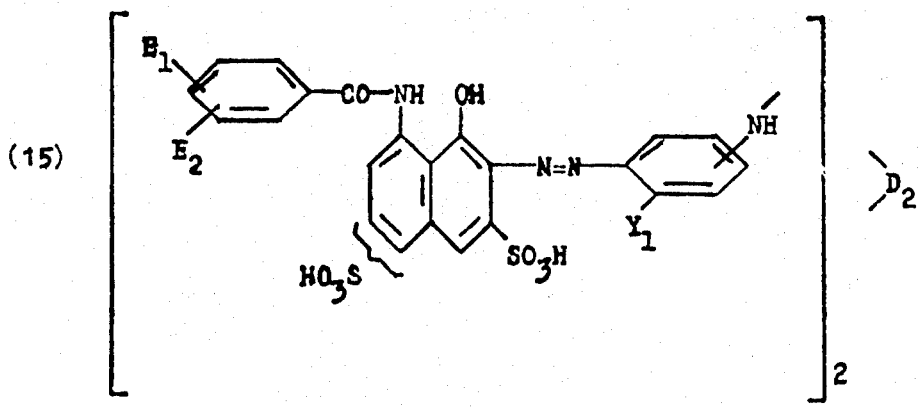

wherein the radicals $E_1$ and $E_2$ are in the 3-, 4- or 5-position to the —CO— group and $E_1$ and $E_2$ each denotes halogen, hydrogen, nitro, nitrile, trifluoromethyl, lower alkyl, lower alkoxy or a radical of the formula 15a. —CO — $W_1$,
15b. — $SO_2$ — $W_2$,
15c. — NH — CO — $W_3$ or
15d. — NH — $SO_2$ — $W_4$ wherein $W_1$ represents hydroxyl, lower alkyl, lower alkoxy, phenyl or an optionally substituted amino group, $W_2$ denotes hydroxyl, lower alkyl, phenyl or an optionally substituted amino group, $W_3$ represents hydrogen, lower alkyl, phenyl, HOOC-alkylene, HOOC-alkenylene, HOOC-phenylene, $HO_3S$-phenylene, furyl, thienyl or pyridyl and $W_4$ represents lower alkyl, phenyl, lower alkylphenylene or HOOC-phenylene, and n, $Y_1$ and $D_2$ have the indicated meaning.

Amongst the polyazo dyestuffs of the Formula (15) those are preferred which correspond to the formula

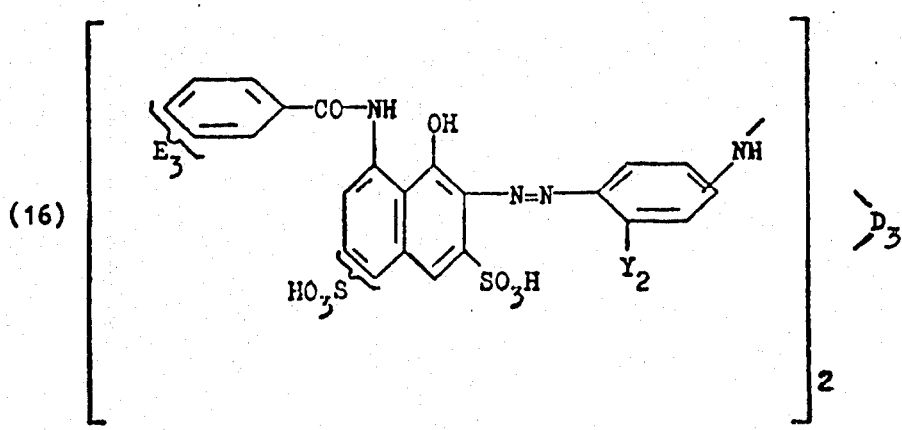

and especially to the formula

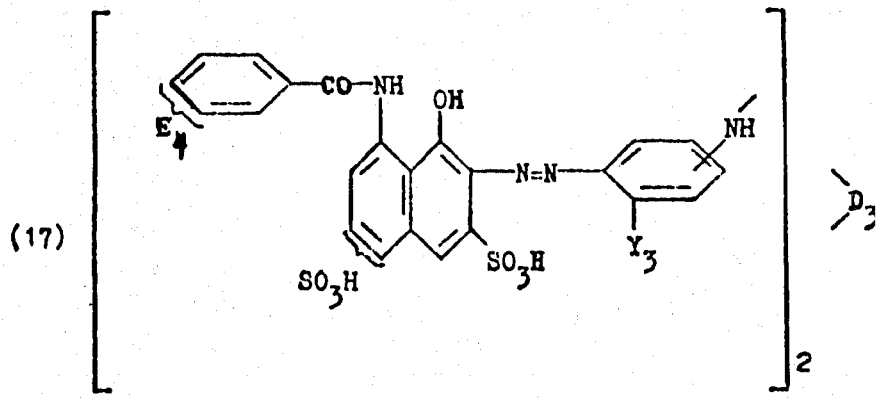

wherein $n$, $Y_2$, $Y_3$ and $D_3$ have the indicated meaning and $E_3$ denotes hydrogen, a halogen atom, nitrile, trifluoromethyl, lower alkyl, lower alkoxy or a radical $-CO-W_5$, $-SO_2-W_6$, $-NH-CO-W_7$ or $-NH-SO_2-W_8$, wherein $W_5$ represents lower alkyl or lower alkoxy, $W_6$ represents lower alkyl or an optionally substituted amino group, $W_7$ represents lower alkyl or -alkylene-COOH and $W_8$ represents lower alkyl, and $E_4$ denotes hydrogen, chlorine, nitrile, acetyl, carbomethoxy, sulphonamido, methylsulphonyl or methanesulphonylamino.

In the polyazo dyestuffs of the Formulae (6) and (15) to (17), the —NH— group is preferably also in the p- or m-position to the azo group in the benzene radical.

Preferred polyazo dyestuffs of this nature correspond to the formula

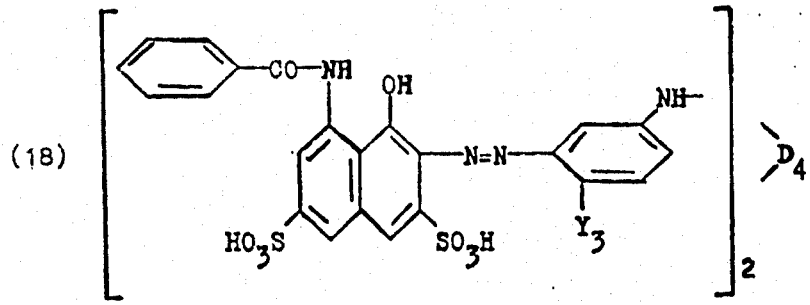

(18)

or

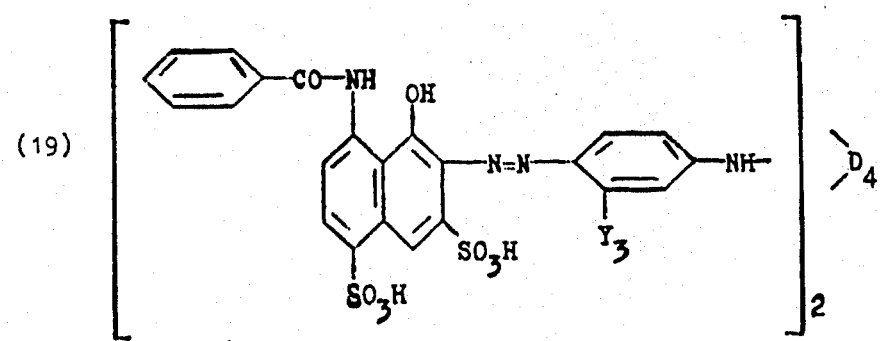

(19)

wherein $Y_3$ and $D_4$ have the indicated meaning.

A suitable example of a dyestuff of the Formula (19) corresponds, for example, to the formula

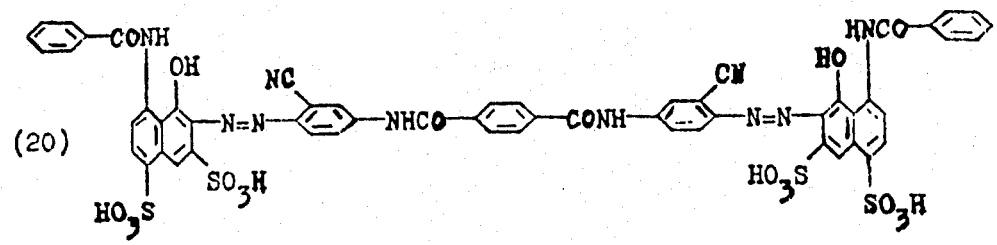

(20)

[= Dyestuff (301) of Table III]

The dyestuffs of the Formulae (1), (2) and (4) to (20) can not only be, as indicated, in the form of their free acids, that is to say with HOOC— or HO₃S— groups, but also be in the form of a salt. Depending on the conditions under which the dyestuff is separated out, for example on the chosen pH-value or on the cation which presents the salt used for separating out the dyestuff, the acid groups can be present as $-SO_3^-$ — or $-COO^-$-cation⁺ groups, such as, for example, $-SO_3Na$, $-SO_3K$, $(-SO_3)_2Ca$, $-COONa$, $-COOLi$, or $-COONH_4$. Thus, the salts are preferably salts of the alkaline earth group or especially of the alkali group.

The radicals A and A' in the Formula (1) are, for example, derived from 2-amino-8-hydroxy-naphthalene-6-sulphonic acid or 2-amino-8-hydroxy-naphthalene-3,6-disulphonic acid, wherein the amino group can be substituted by aliphatic or aromatic radicals.

Examples of such substituents are: methyl, hydroxyethyl, phenyl, 2,6-dimethylphenyl, 2- or 3- or 4-chlorophenyl, 2,3- or 3,4- or 3,5-dichlorophenyl, 2- or 3- or 4-fluorophenyl, 2-methyl-4- or 2-methyl-5-chlorophenyl, 3-trifluoromethylphenyl, 2,6-dimethoxyphenyl, 2- or 4-phenylsulphonic acid, 2-methylphenyl-4-sulphonic acid, 4-chlorophenyl-3-sulphonic acid, 3- or 4-acetylphenyl, 3- or 4-methylsulphonylphenyl, 4-bromophenyl, 4-phenoxy-phenyl-3-sulphonic acid, 4-chloro-3-methoxyphenyl, 4-methoxy-phenyl-3-sulphonic acid, 4-phenyl-carboxylic acid, 4-phenyl-(N,N-dimethyl)-carboxylic acid amide and 4-phenyl-(N,N-diethyl)sulphonic acid amide.

Further, the radicals A or A' in the formula (1) are derived, for example, from 1-amino-8-hydroxy-3,6- or 4,6-disulphonic acid, wherein the amino group can be substituted by acyl groups. Examples of such acyl groups are, for instance: acetyl, caproyl, mesyl, benzenesulphonyl, p-toluenesulphonyl, nicotinoyl, benzoyl, 4-bromobenzoyl, 2,4-dichlorobenzoyl, 4-methoxybenzoyl, 4-toluyl-, 3,5-dinitrobenzoyl, 3-trifluoromethylbenzoyl, 4-cyanobenzoyl, 4-methylsulphonylbenzoyl, 3-methylsulphamoylbenzoyl, 4-chloro-3-sulphamoylbenzoyl, 4-benzoylaminobenzoyl, 4-chloro-3-nitrobenzoyl, 3-acetylaminobenzoyl, 4-carbomethoxybenzoyl, 4-benzoylbenzoyl, 4-acetylbenzoyl, 4-succinylaminobenzoyl, 4-glutarylaminobenzoyl, 4-fumaroylaminobenzoyl, 4-benzenesulphonylaminobenzoyl, 4-[4'-toluenesulphonyl]-aminobenzoyl, 4-methylsulphonylaminobenzoyl, 4-furoylaminobenzoyl, 4-pyridoylaminobenzoyl, 3-thienoylaminobenzoyl, benzoyl-3-sulphonic acid, benzoyl-4-carboxylic acid, 3-formylaminobenzoyl, 4-(3'-sulphobenzoylamino)-benzoyl, 4-benzoylaminobenzoyl-4'-carboxylic acid and 4-phenylsulphonylbenzoyl.

The radicals M and M' in the Formula (1) are derived from the following nitroaminobenzenes or diaminobenzenes: 2-amino-5-nitro-benzotrifluoride, 2-amino-5-nitro-benzontrile, 2-amino-4-acetylamino-benzonitrile, 2-amino-5-nitro-benzenesulphonamide, 2-amino-5-nitro-(N-methyl)-benzenesulphonamide, 2-amino-5-nitro-(N,N-dimethyl)-benzenesulphonamide, 2-amino-5-nitro-(N-β-hydroxyethyl)benzenesulphonamide, 2-amino-5-nitro-(N,N-bis-β-hydroxyethyl)-benzenesulphonamide, 2-amino-5-nitro -(N-methyl-N-β-sulphoethyl)-benzenesulphonamide, 2-amino-5-nitro-(N-methyl-N-β-hydroxyethyl)-benzenesulphonamide, 2-amino-5-nitro-(N-methoxypropyl)-benzenesulphonamide, 2-amino-5-nitro-(N-phenyl)-benzenesulphonamide, 2-amino-5-nitro-(N-methyl-N-anthranyl)-benzenesulphonamide, 2-amino-5-nitro-(N-metanyl)-benzenesulphonamide, 2-amino-5-nitro-(endo-N-morpholinyl)-benzenesulphonamide, 2-amino-5-nitro-(endo-N-piperidyl)-benzenesulphonamide, 2-amino-5-nitro-(endo-N-pyrrolidinyl)-benzenesulphonamide, 2-amino-5-nitro-(endo-N'-piperazinyl)-benzenesulphonamide, 2-amino-4-acetylamino-benzenesulphonamide and its derivatives, 2-methylsulphonyl-4-nitroaniline, 2-methylsulphonyl-5-methyl-4-nitroaniline, 2-methylsulphonyl-5-methoxy-4-nitroaniline, 2-methylsulphonyl-5-chloro-4-nitroaniline, 2-methylsulphonyl-5-methylmercapto-4-nitroaniline, 2-methylmercapto-4-acetylamino-aniline, 4-methylsulphonyl-3-nitroaniline, 2-ethylsulphonyl-4-acetylamino-aniline, 2-[n-butylsulphonyl]4-acetylamino-aniline, 2-[iso-butylsulphonyl]-4-acetylaminoaniline, 2-amino-4-acetylamino-diphenylsulphone, 2-amino-4-acetylamino-3'-methyl-diphenylsulphone, 3-[2'-amino-5'-nitro-benzenesulphonylamino-]-benzoic acid, 2-[2'-amino-5'-nitrophenylsulphonyl-]ethanol and 2-amino-4-acetylamino-4'-methyl-3'-sulpho-diphenylsulphone.

The bridge member D in the Formula (1) is derived from, for example, the following acid halides: phosgene, succinic acid dichloride, thiophosgene, glutaric acid dichloride, pimelic acid dichloride, chlorosuccinic acid dichloride, 2,3-dichlorosuccinic acid dichloride, fumaric acid dichloride, terephthaloyl chloride, isophthaloyl chloride, 5-nitroisophthaloyl chloride, thiophene-2,5-dicarboxylic acid dichloride, furane-2,5-dicarboxylic acid dichloride, pyridine-2,5-dicarboxylic acid dichloride, pyridine-2,4-dicarboxylic acid dichloride, pyridine-2,6-dicarboxylic acid dichloride, pyridine-3,5-dicarboxylic acid dichloride, pyrrole-2,5-dicarboxylic acid dichloride, diphenylurea-4,4'-dicarboxylic acid dichloride, diphenylurea-3,3'-dicarboxylic acid dichloride, diphenylketone-4,4'-dicarboxylic acid dichloride, diphenylketone-3,3'-dicarboxylic acid dichloride, diphenylketone-3,4'-dicarboxylic acid dichloride, diphenylsulphone-4,4'-dicarboxylic acid dichloride, diphenylsulphone-3,3'-dicarboxylic acid dichloride, diphenylsulphone-3,4'-dicarboxylic acid dichloride, benzene-1,3-disulphonic acid dichloride, diphenylmethane-4,4'-dicarboxylic acid dichloride, diphenylsulphide-4,4'-dicarboxylic acid dichloride, 4,4'-dimethyl-azobenzene-3,3'-dicarboxylic acid dichloride, 4,4'-dichloro-azobenzene-3,3'-dicarboxylic acid dichloride, 2,2'-dichloro-azobenzene-5,5'-dicarboxylic acid dichloride, 2,2'-dimethyl-azobenzene-5,5'-dicarboxylic acid dichloride, 2,2'-dimethoxy-azobenzene-5,5'-dicarboxylic acid dichloride, azobenzene-3,3'-dicarboxylic acid dichloride, azobenzene-4,4'-dicarboxylic acid dichloride, azobenzene-3,4'-dicarboxylic acid dichloride, naphthalene-2,6-dicarboxylic acid dichloride, azobenzene-4,4'- and 3,3'-disulphonic acid dichloride, 2,2'-dimethylazobenzene-4,4'-dicarboxylic acid dichloride, 4-methoxyazobenzene-3,4'-dicarboxylic acid dichloride, 3,3'-dichloroazobenzene-4,4'-dicarboxylic acid dichloride, 4,4'-dichloroazobenzene-5,5'-dicarboxylic acid dichloride, 4,6-dichloropyrimidine, 1-phenyl-3,5-dichloro-2,4,6-triazine or 1-methoxy-3,5-dichloro-2,4,6-triazine. Furthermore cyanuric chloride can also be used.

The azo dyestuffs of the Formula (1) are manufactured according to methods which are in themselves known.

One process, for example, is characterised in that at least one compound of the formula

21. A — N = N — M — NH₂ is reacted with a halide of an acid of the formula

22. HO — L₁ — D' — L₂ — OH wherein A and M have the indicated meaning, D' represents an organic radical and L₁ and L₂ each represent —CO— or —SO₂—, or with phosgene.

The starting compounds of the Formula (21) are obtained if an aniline of the formula 23.1. H₂N—M—NO₂ or 23.2. H₂N—M'—NO₂ or 23.3. H₂N—M—NH—U or 23.4. H₂N—M'—NH—U' wherein U denotes a protective group which can be removed, is diazotised and coupled with a compound of the formula 24.1. A — H or 24.2. A' — H.

After reduction of the nitro group and/or splitting off of the protective group, an aminoazo dyestuff of the Formula (21) or 25. A' — N = N — M'— NH₂ is obtained.

It is then possible to link 2 mols of the amino compound of the Formula (21) or (25) with one mol of bridge member, for example of the formula

(26) 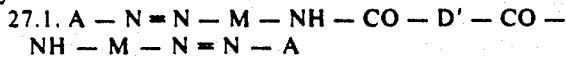

wherein Hal represents halogen, n and m are 1 or 2 and D' has the indicated meaning, so that symmetrical azo dyestuffs of the formula 27.1. A — N=N — M — NH — CO — D' — CO — NH — M — N=N — A or 27.2. A' — N=N — M' — NH — CO — D' — CO — NH — M' — N=N — A' are obtained. If 1 mol of a compound of the Formula (21) and 1 mol of a compound of the Formula (25) are successively reacted with 1 mol of bridge member of the Formula (26), the corresponding asymmetrical azo dyestuffs of the Formula (1) are obtained. Furthermore, it is also possible to allow a mixture of different dyestuffs of the Formula (21) to react with a compound of the Formula (26).

A different process for the manufacture of dyestuffs of the Formula (1) is that an aminonaphthol of the Formula (24.1) and/or (24.2) is reacted with a tetraazo compound of a diamine of the formula

28. $H_2N—M—D—M'—NH_2$ wherein M, M' and D have the indicated meaning.

A further process for the manufacture of dyestuffs of the Formula (1) is characterized, for example, in that an aminonaphthol of the Formula (24.1) or (24.2) is reacted with a diazo compound of an aminoazo dyestuff of the formula

29. A—N=N—M—D—M'—NH₂ wherein A, M, M' and D have the indicated meaning. This method is in particular suitable for the manufacture of asymmetrical azo dyestuffs. The compounds of the Formula (29) are obtained by diazotisation of a compound of the formula 30.1. $H_2N—M—D—M'—NO_2$ or 30.2. $H_2N—M—D—M'—NH—U$ wherein M, M', D and U have the indicated meaning, and coupling to a compound of the Formula (24.1) or (24.2).

The condensation of amines with acid dichlorides is advantageously carried out in polar solvents such as water, diethylacetamide, dimethylformamide or N-methylpyrrolidone or mixtures thereof.

It can also be of advantage to effect the condensation in the presence of acid-binding agents such as, for example, alkali carbonates or alkali borates. Solvents such as pyridine themselves already serve as acid-binding agents.

The dyestuffs of the Formula (1) are used for various purposes in photographic materials and amongst these particularly advantageously as image dyestuffs for the silver dye bleach process. Accordingly, valuable photographic materials which contain, on a layer carrier, at least one layer with a dyestuff of the Formula (1), can be manufactured in the customary manner which is in itself known.

In particular, these dyestuffs can be present in a multi-layer material which contains, on a layer carrier, a layer dyed with a cyan dyestuff which is selectively sensitive to red, on top of this a layer dyed with a magenta dyestuff of the Formula (1) which is selectively sensitive to green and finally a layer dried with a yellow dyestuff, which is sensitive to blue. It is, however, also possible to incorporate the dyestuffs of the Formula (1) in an auxiliary layer or especially into a layer adjacent to the light-sensitive layer.

Furthermore, the dyestuffs of the Formula (1) can also be used, for example, for retouching purposes.

In most cases it suffices to add the dyestuffs to be used according to the invention, as a solution in water or in a water-miscible solvent, to an aqueous gelatine solution at normal or slightly elevated temperature, whilst stirring well. Thereafter the mixture is brought together with a gelatine containing silver halide and/or other materials for the production of photographic images, cast in the usual manner on a substrate to give a layer, and dried if required.

The dyestuff solution can also be added directly to a gelatine containing silver halide and/or other materials for the production of photographic images. Thus it is, for example, possible only to meter in the dyestuff solution immediately prior to casting.

Instead of simple stirring, the usual methods of distribution by means of kneading forces and/or shear forces to ultrasonics can also be employed.

It is also possible to add the dyestuff not as a solution but in the solid form or as a paste.

The casting solution can contain yet further additives, such as hardeners, sequestring agents and wetting agents, as well as sensitisers and stabilisers, for the silver halide.

The dyestuffs neither undergo chemical reactions with the light-sensitive materials nor impair their sensitivity to light. The dyestuffs of the Formula (1) are at the same time very diffusion-resistant and also form stable, aqueous solutions which are insensitive to calcium ions and can easily be bleached to white.

On addition to the casting solutions, the dyestuffs cause neither an increase in viscosity nor a significant change in viscosity on leaving the casting mixture to stand.

The spectral absorption in gelatine lies in an advantageous range, so that the dyestuffs of the Formula (1) can be combined with a suitable yellow and cyan dyestuff to give a triple dyestuff combination which shows grey shades appearing neutral to the eye over the entire density range.

The dyestuffs of the Formula (1) are distinguished by particularly high fastness to light.

In the manufacturing instructions and examples which follow, the percentages are percentages by weight.

MANUFACTURING EXAMPLES (GROUP 1)

EXAMPLE 1

1.1 A solution of 7.65 g. of 2-amino-5-nitro-(N,N-β-di-hydroxyethyl)-benzenesulphonamide in 50 ml of pyridine, 20 ml of water and 6.5 ml of 4 N sodium nitrite solution is diazotised by adding it dropwise to a mixture of 100 ml of 37% strength hydrochloric acid and 100 g of ice. The whole is stirred for a further 15 minutes and the excess nitrite is then destroyed with sulphamic acid. A solution of 6.4 g of 2-amino-8-naphthol-6-sulphonic acid in 75 ml of water is then added at 0°C. The reaction mixture is stirred for a further hour, a 30% strength sodium hydroxide solution is added until pH 3 is reached, and the whole is warmed to 40°C. After stirring for half an hour, the dyestuff which has separated out is filtered off whilst warm and is washed with ethanol.

The nitroazo dyestuff thus obtained is reduced in 300 ml of water with 8.9 g of sodium sulphide at 40°C. After one hour, the reaction is complete. The aminoazo dyestuff is precipitated with a 7 N potassium acetate solution. The crude dyestuff is dissolved in water, an equivalent amount of dioxane is added, and the mixture is clarified by filtration. After distilling off the dioxane, the dyestuff is precipitated with a potassium chloride solution, filtered off and dired. Yield: 6.7 g. of the aminoazo dyestuff of the formula

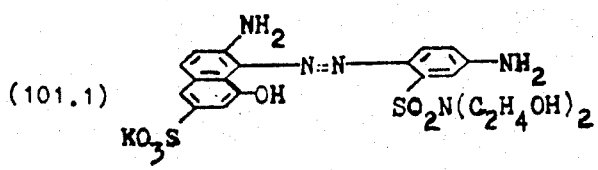

(101.1)

1.2 1.1 g of the aminoazo dyestuff of the Formula (101.1) are dissolved in 20 ml of water and 10 ml of dimethylformamide and 0.2 g of terephthalic acid dichloride in 1 ml of acetone is added at ice bath temperature. At the same time the pH-value is kept at 7 by adding 2 N sodium carbonate solution. After stirring for one hour, 0.1 g of terephthalic acid dichloride is again added and the mixture is stirred for a further hour at pH 7 and 0° to 5°C. The dyestuff which has separated out is filtered off and purified by dissolving it in water and precipitating it. Yield: 0.6 g of the dyestuff of the formula (101).

EXAMPLE 2

2.1 16.3 g of 2-amino-5-nitro-benzonitrile are dissolved in 95 g of nitrosylsulphuric acid at room temperature and the solution is left to stand in the dark for 15 hours. The reaction mixture is carefully poured onto ice and the resulting clear diazonium solution is then added dropwise at 10°-15°C and pH 7 to a solution of 73 g of 1-benzoylamino-8-naphthol-4,6-disulphonic acid (73% strength) in 800 ml of water, whilst stirring well. The mixture is stirred for a further 2.5 hours at room temperature; the resulting nitroazo dyestuff is precipitated by means of a saturated sodium chloride solution, filtered off, washed with dilute sodium chloride solution and then dissolved in 2,000 ml of water at 40°C. 74.4 g of $Na_2S.9H_2O$ are then added at 40°C; the mixture is stirred for one hour at 40°C until no nitroazo dyestuff is detectable by thin layer chromatography. The reaction mixture is then slightly acidified with 37% strength hydrochloric acid and salted-out with sodium chloride. The residue is dissolved in water and re-precipitated with ethanol, filtered off, washed and dried.

Yield: 24 g of the aminoazo dyestuff of the formula

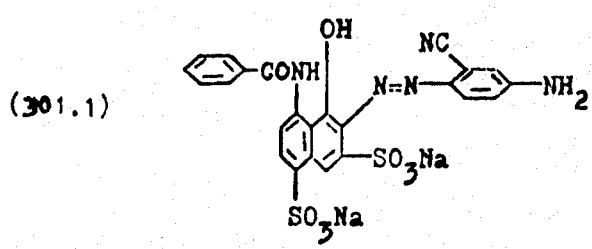

(301.1)

2.2 2.0 g of the aminoazo dyestuff of the Formula (301.1) and 2.0 g of sodium tetraborate are dissolved in 100 ml of water, the resulting solution is clarified by filtration, a solution of 0.35 g. of terephthalic acid dichloride in 10 ml of absolute acetone is added at room temperature whilst stirring well, and the whole is then stirred for one hour at 70°C. The resulting disazo dyestuff is precipitated with 100 ml of ethanol and filtered off. The red dyestuff is dissolved in 200 ml of water, the solution is clarified by filtration, and the dyestuff is precipitated with ethanol. After filtering off and drying at 40°C in vacuo, 1.6 g of the dyestuff of the Formula (301), which according to a thin layer chromatogram is a single substance, are obtained.

The remaining dyestuffs of Tables I to III are manufactured analogously.

Tables I to III below lists the dyestuffs of the Formulae (101) to (121), (201) to (208) and (301) to (303).

In all tables the columns denote the following:

Column (1): Formula No.
Column (2): Position of the second $HO_3S$ - group in the naphthalene nucleus.
Column (3): Position of -NH- relative to the azo group.
Column (4): Absorption maxima in nm
(a) measured in $DMF/H_2O$, 1:1
(b) measured in gelatine.

The remaining symbols in Tables I to III relate to the following formulae:

TABLE I

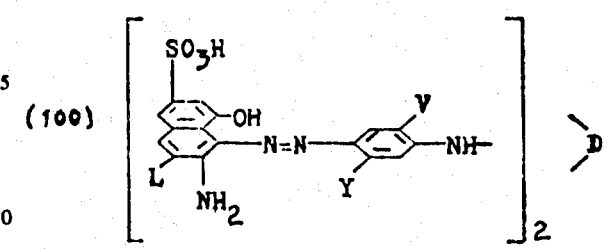

(100)

TABLE II

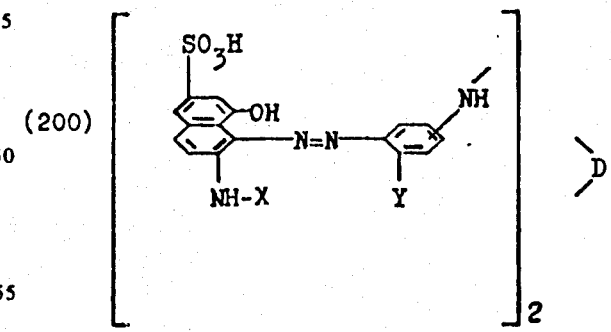

(200)

TABLE III

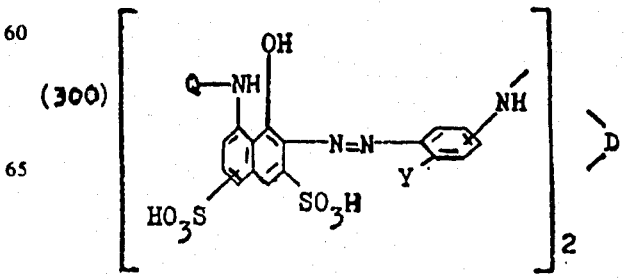

(300)

TABLE I

| (1) | V | L | Y | D | (4) (a) | (b) |
|---|---|---|---|---|---|---|
| 101 | —H | —H | —SO$_2$—N—(C$_2$H$_4$OH)$_2$ | —OC—⟨C$_6$H$_4$⟩—CO— (para) | 532/561 | 531/560 |
| 102 | —H | —H | —SO$_2$—N—(C$_2$H$_4$OH)$_2$ | —OC—⟨C$_6$H$_4$⟩—CO— (meta) | 529 | 505/580 |
| 103 | —H | —H | —SO$_2$—N—(C$_2$H$_4$OH)$_2$ | —CO— | 540/562 | 512 |
| 104 | —H | —H | —SO$_2$CH$_3$ | —CO— | 546/570 | 516/595 |
| 105 | —H | —H | —SO$_2$CH$_3$ | —OC—⟨C$_6$H$_4$⟩—CO— (para) | 538/560 | 502/580 |
| 106 | —H | —H | —SO$_2$CH$_3$ | —OC—⟨C$_6$H$_4$⟩—CO— (meta) | 534/554 | 507/582 |
| 107 | —H | —H | —SO$_2$—⟨C$_6$H$_3$(CH$_3$)(SO$_3$H)⟩ | —CO— | 550/574 | 537/590 |
| 108 | —H | —H | —SO$_2$—⟨C$_6$H$_3$(CH$_3$)(SO$_3$H)⟩ | —OC—⟨C$_6$H$_4$⟩—CO— (para) | 546/570 | 536/585 |
| 109 | —H | —H | —SO$_2$—⟨C$_6$H$_3$(CH$_3$)(SO$_3$H)⟩ | —OC—⟨C$_6$H$_4$⟩—NH—CO—NH—⟨C$_6$H$_4$⟩—CO— | 539/558 | 535/578 |
| 110 | —H | —H | —CF$_3$ | —CO— | 531/553 | 499/576 |
| 111 | —H | —H | —CF$_3$ | —OC—⟨C$_6$H$_4$⟩—CO— (para) | 523/543 | 512/560 |
| 112 | —H | —H | —CF$_3$ | —OC—⟨C$_6$H$_4$⟩—CO— (meta) | 520/550 | 513/556 |
| 113 | —H | —H | —CN | —OC—⟨C$_6$H$_4$⟩—CO— (para) | 527/559 | 516/570 |
| 114 | —H | —H | —SO$_2$—N(CH$_3$)(CH$_2$CH$_2$SO$_3$H) | —OC—⟨C$_6$H$_4$⟩—CO— (meta) | 534/560 | 503/580 |
| 115 | —H | —H | —SO$_2$—N(CH$_3$)(CH$_2$CH$_2$SO$_3$H) | —OC—⟨C$_6$H$_4$⟩—CO— (para) | 537/560 | 508 |
| 116 | —H | —H | —SO$_2$—NH—C$_2$H$_4$OH | —OC—⟨C$_6$H$_4$⟩—CO— (para) | 540/560 | 500 |
| 117 | —H | —H | —SO$_2$—NH—C$_6$H$_5$ | —OC—⟨C$_6$H$_4$⟩—CO— (meta) | 536/560 | 515/560 |
| 118 | —H | —H | —SO$_2$—NH$_2$ | —OC—⟨C$_6$H$_4$⟩—CO— (meta) | 522/544 | 521/560 |
| 119 | —H | —H | —SO$_2$—NH$_2$ | —OC—⟨C$_6$H$_4$⟩—CO— (para) | 524/544 | 523/560 |
| 120 | —H | —H | —SO$_2$—NH$_2$ | —OC—⟨C$_6$H$_4$⟩—SO$_2$—⟨C$_6$H$_4$⟩—CO— | 522/544 | 532/562 |
| 121 | —H | —H | —SO$_2$—NH$_2$ | —OC—⟨C$_6$H$_4$⟩—N=N—⟨C$_6$H$_4$⟩—CO— | 525/544 | 525/560 |

TABLE I-continued

| (1) | V | L | Y | D | (4) (a) | (b) |
|---|---|---|---|---|---|---|
| 122 | —CH₃ | —H | —SO₂CH₃ | —CO— | 537/570 | 508/590 |
| 123 | —CH₃ | —H | —SO₂CH₃ | —OC—C₆H₄—CO— | 534 | 498/580 |
| 124 | —Cl | —H | —SO₂CH₃ | —CO— | 538/570 | 509/598 |
| 125 | —H | —H | —SO₂NH₂ | —OC—C₆H₄—SO₂—C₆H₄—CO— | 520/540 | 522/560 |
| 126 | —H | —H | —SO₂NH₂ | —OC—(pyridine)—CO— | 526/546 | 527/566 |
| 127 | —H | —H | —SO₂N(CH₃)₂ | —OC—C₆H₄—CO— | 535/560 | 500 |
| 128 | —H | —SO₃H | —CN | —OC—C₆H₄—CO— | 532/554 | 529/570 |
| 129 | —OCH₃ | —H | —SO₂CH₃ | —OC—C₆H₄—CO— | 541/565 | 525/593 |
| 130 | —H | —H | —SO₂NHCH₃ | —OC—C₆H₄—CO— | 537/562 | 500/594 |
| 131 | —H | —H | —SO₂NHCH₃ | —OC—(furan)—CO— | 534/559 | 504/594 |
| 132 | —H | —H | —SO₂NHCH₃ | —OC—(thiophene)—CO— | 535/561 | 505/594 |
| 133 | —H | —H | —SO₂NH—(CH₂)₃—OCH₃ | —OC—C₆H₄—CO— | 540/564 | 504/594 |
| 134 | —H | —H | —SO₂NH—(CH₂)₃—OCH₃ | —OC—(furan)—CO— | 535/560 | 506/592 |
| 135 | —H | —H | —SO₂—N(morpholino) | —OC—C₆H₄—CO— | 537/560 | 548/589 |
| 136 | —H | —H | —SO₂—N(pyrrolidino) | —OC—C₆H₄—CO— | 535/557 | 506/576 |
| 137 | —H | —H | —SO₂—NH—(2-OCH₃,4-Br,5-CH₃-phenyl) | —OC—C₆H₄—CO— | 540/557 | 554/593 |
| 138 | —H | —H | —SO₂—NH—C₆H₄—COOH | —OC—C₆H₄—CO— | 540/561 | 530 |
| 139 | —H | —H | —SO₂—NH—C₆H₄—COOH | —OC—(thiophene)—CO— | 534/562 | 533 |
| 140 | —H | —H | —SO₂—NH—C₆H₄—SO₃H | —OC—C₆H₄—CO— | 542/562 | 524/582 |

TABLE II
| (1) | Y | X | D | (3) | (4)(a) | (b) |
|---|---|---|---|---|---|---|
| 201 | —SO₂CH₃ | 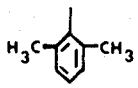 | —CO— | p | 558/586 | 565/596 |
| 202 | —SO₂CH₃ | 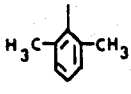 | —OC—⌬—CO— | p | 548/571 | 567/611 |
| 203 | —CF₃ | 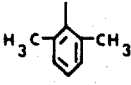 | —CO— | p | 548/576 | 549/583 |
| 204 | —CF₃ | 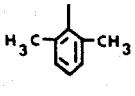 | —OC—⌬—CO— | p | 539/562 | 537/569 |
| 205 | —CF₃ | 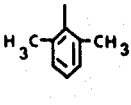 | —OC—⌬—CO— | p | 538/560 | 552/596 |
| 206 | —SO₂CH₃ | 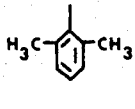 | —CO— | m | 536/552 | 538/560 |
| 207 | —SO₂CH₃ | 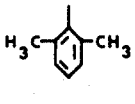 | —OC—⌬—CO— | m | 537/551 | 542/554 |
| 208 | —CN | 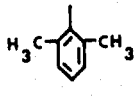 | —OC—⌬—CO— | p | 530/554 | 532/565 |
| 209 | —CF₃ | —CH₃ | —OC—⌬—CO— | p | 532/570 | 502/582 |
| 210 | —CF₃ | —CH₃ | 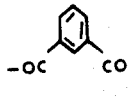 | p | 531/566 | 505/586 |
| 211 | —SO₂CH₃ | —CH₃ | 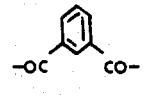 | m | 550/557 | 511/580 |
| 212 | —SO₂CH₃ | —CH₃ | —CO— | m | 530/557 | 570/615 |
| 213 | 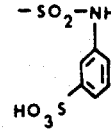 | —CH₃ | 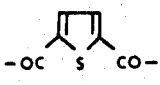 | p | 549/577 | 536/594 |

TABLE III

| (1) | Q | Y | D | (2) | (3) | (4)(a) | (b) |
|---|---|---|---|---|---|---|---|
| 301 | ⬡-CO- | -CN | -OC-⬡-CO- | 5 | p | 534/558 | 474/540 |
| 302 | ⬡-CO- | -SO₂CH₃ | -CO- | 6 | m | 524 | 527/559 |
| 303 | ⬡-CO- | -SO₂CH₃ | -OC-⬡-CO- | 5 | p | 536/550 | 536/575 |
| 304 | Cl-⬡-CO- | -SO₂CH₃ | -OC-⬡-CO- | 6 | p | 544/563 | 575 |
| 305 | H₃C-⬡-SO₂- | -SO₂CH₃ | -OC-⬡-CO- | 6 | p | 534/553 | 545 |
| 306 | (pyridyl)-CO- | -SO₂CH₃ | -OC-⬡-CO- | 6 | p | 543/564 | 577 |

USE EXAMPLES (GROUP 2)

EXAMPLE 1

3.3 ml of a 6% strength gelatine solution, 2.0 ml of a 1% strength aqueous solution of the hardener of the formula

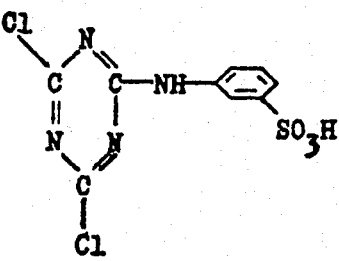

(401)

1.0 ml of a 1% strength aqueous solution of the magenta dyestuff of the Formula (108) and 3.3 ml of silver bromide emulsion, containing 35 g of silver per liter, are pipetted into a test tube and made up to 10.0 ml with deionised water. This solution is vigorously mixed and kept at 40°C in a waterbath for 5 minutes.

The casting solution, which is at 40°C, is cast on a 13 cm × 18 cm substrated glass plate. After solidifying at 10°C, the plate is dried in a drying cabinet with circulating air at 32°C.

A strip, cut to 3.5 cm × 18 cm, is exposed for 3 seconds with 50 Lux/cm² under a step wedge and through a Kodak 2b + 49 blue filter. Thereafter it is further processed as follows:

1. 10 minutes' developing in a bath which per liter contains 1 g of p-methylaminophenol sulphate, 20 g of anhydrous sodium sulphite, 4 g of hydroquinone, 10 g of anhydrous sodium carbonate and 2 g of potassium bromide;
5. 20 minutes' dye-bleaching in a bath which per liter contains 27.5 ml of 96% strength sulphuric acid, 10 g of potssium iodide and 15 ml of a solution of 0.3 g of 2,3-dimethyl-6-aminoquinoxaline in 50 ml of ethanol;
6. 4 minutes' soaking;
7. 8 minutes' bleaching of residual silver in a bath which per liter contains 50 g of potassium ferricyanide, 15 g of potassium bromide, 10 g of disodium phosphate and 14 g of monosodium phosphate;
8. 6 minutes' soaking;
9. 6 minutes' fixing as indicated under 3.);
10. 10 minutes' soaking.

A brilliant, light-fast purple wedge is obtained which is completely bleached to white in the position of what was originally the greatest density of silver.

Similar results are obtained on using one of the other dyestuffs of Tables I to III.

EXAMPLE 2

The following layers are successively applied to an opaque white acetate film provided with an adhesive layer:

1. Red-sensitive silver bromide emulsion in gelatine, containing the cyan dyestuff of the formula

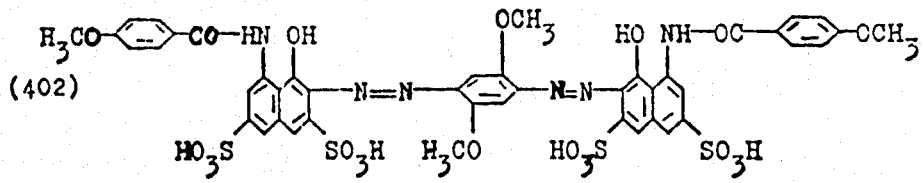

(402)

2. 2 minutes' soaking;
3. 6 minutes' stop-fixing in a bath which per liter contains 200 g of crystalline sodium thiosulphate, 15 g of anhydrous sodium sulphite, 25 g of crystalline sodium acetate and 13 ml of glacial acetic acid;
4. 8 minutes' soaking;

2. Colourless gelatine layer without silver halide.
3. Green-sensitive silver bromide emulsion in gelatine, containing the magenta dyestuff of the Formula (201).
4. Blue-sensitive silver bromide emulsion in gelatine, containing the yellow dyestuff of the formula (403) 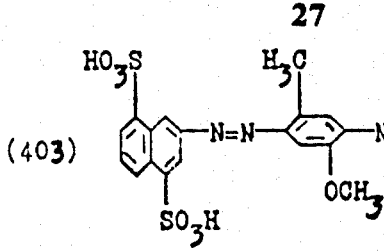 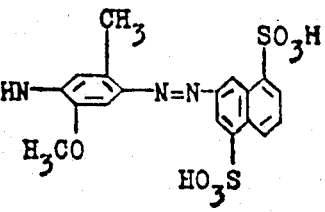

The gelatine layers can additionally contain additives such as wetting agents, hardeners and stabilisers for the silver halide. In other respects, the procedure followed is such that the individual layers contain, per square meter of film, 0.5 g of the particular dyestuff and the amount of silver bromide corresponding to 1 – 1.2 g of silver.

This film is exposed with red, green and blue copying light under a coloured diapositive. Thereafter the copy is developed in accordance with the instruction indicated in Example 1.

A light-fast and a document-fast positive direct-viewing image is obtained.

Similar results are obtained if instead of the dyestuff of the Formula (201) a different dyestuff of Tables I to III is used.

EXAMPLE 3

3.3 ml of 6% strength gelatine solution, 2.0 ml of a 1% strength aqueous solution of the hardener of the Formula (401), 3.3 ml of silver bromide emulsion containing 35 g of silver per liter, and 1.4 ml of deionised water are pipetted into a test tube.

The whole is thoroughly mixed and kept at 40°C in a waterbath for 5 minutes.

The casting solution, which is at 40°C, is cast on a 13 cm × 18 cm substrated glass plate. After solidifying at 10°C, the plate is dried in a drying cabinet with circulating air at 32°C.

A mixture of 3.3 ml of a 6% strength gelatine solution, 2.0 ml of a 1% strength aqueous solution of the hardener of the Formula (401), 0.5 ml of a 1% strength aqueous solution of the magenta dyestuff of the Formula (102) and 4.2 ml of deionised water is then cast onto the dried layer.

The new layer is allowed to solidify and dry as indicated above.

A strip, cut to 3.5 cm × 18 cm, is exposed with 50 Lux/cm² for 10 seconds under a step wedge and through a Kodak 2b + 49 blue filter.

Thereafter, the procedure described in Example 1 is followed.

A brilliant, very light-fast purple wedge is obtained, which is completely bleached to white in the position of what was originally the greatest density of silver.

Similar results are obtained if instead of the dyestuff of the Formula (102) a different dyestuff of Tables I to III is used.

EXAMPLE 4

A test strip which has been manufactured in accordance with Example 1 using the magenta dyestuff of the Formula (115), and has been exposed in accordance with Example 1, is processed as follows:

1. 5 minutes' developing in a bath which per liter contains 1 g of p-methylaminophenol sulphate, 20 g of anhydrous sodium sulphite, 4 g of hydroquinone, 10 g of anhydrous sodium carbonate, 2 g of potassium bromide and 3 g of sodium thiocyanate;
2. 2 minutes' soaking;
3. 2 minutes' treatment in a reversal bath which per liter contains 5 g of potassium bichromate and 5 ml of 96% strength sulphuric acid;
4. 4 minutes' soaking;
5. 5 minutes' treatment in a bath which per liter contains 50 g of anhydrous sodium sulphite;
6. 3 minutes' soaking;
7. 4 minutes' developing in a bath which per liter contains 2 g of 1-phenyl-3-pyrazolidone, 50 g of anhydrous sodium sulphite, 10 g of hydroquinone, 50 g of anhydrous sodium carbonate, 2 g of sodium hexametaphosphate and 20 ml of a 1% strength aqueous solution of tert.-butylaminoborane;
8. 2 minutes' soaking;
9. further treatment as indicated in Example 1 under 5.) to 10.).

A brilliant, highly light-fast magenta wedge running conversely to the initial original is obtained.

Similar results are obtained on using one of the remaining dyestuffs of Tables I to III.

What we claim is:

1. A disazo dyestuff of the formula

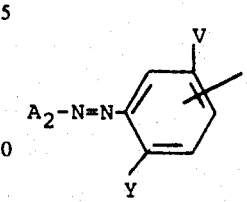 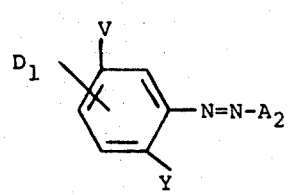

wherein $A_2$ denotes

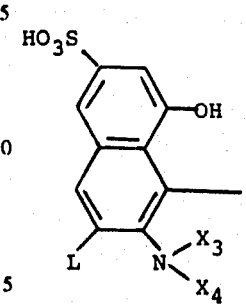 or 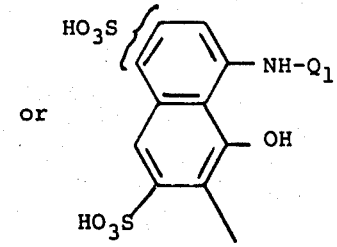

wherein $Q_1$ denotes hydrogen, pyridinecarboxyl, benzoyl, phenylsulfonyl or substituted benzoyl, pyridenecarboxyl or phenylsulfonyl wherein the substituents are selected from the group consisting of
halo, nitro, cyano, trifluoromethyl, lower alkyl,
lower alkoxy,
—CO—$W_1$,
—SO$_2$—$W_2$,
—NH—CO—$W_3$,
or
—NH—SO$_2$—$W_4$
wherein $W_1$ is hydroxyl, lower alkyl, lower alkoxy, phenyl, or —NH₂, W₂ is hydroxyl, lower alkyl, phenyl, or —NH₂, W₃ is hydrogen, lower alkyl, phenyl, HOOC-lower alkylene, HOOC-phenylene, HO₃S-phenylene, furyl, thienyl or pyridyl, and W₄ is lower alkyl, phenyl, lower alkylphenylene or HOOC-phenylene;

X₄ is hydrogen or lower alkyl,

X₃ is hydrogen, lower alkyl, phenyl or substituted phenyl wherein the substituents are selected from the group consisting of lower alkyl, lower alkoxy, halo, sulfo, lower alkylsulphonyl and lower alkylcarbonyl, Y is -CF₃, -CN, -SO₂T₁ or

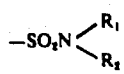

wherein T₁ is lower alkyl, phenyl or lower alkylphenyl, or lower alkyl, phenyl or lower alkylphenyl substituted by hydroxyl, carboxy or sulfo;

R₁ is hydrogen, lower alkyl, lower hydroxyalkyl, lower alkoxyalkyl, sulpho lower alkyl, phenyl or phenyl substituted by carboxy, sulpho, halo, lower alkyl or lower alkoxy;

R₂ is hydrogen, lower alkyl or lower hydroxyalkyl;

V is hydrogen, lower alkyl, lower alkoxy or halo;

L is hydrogen or sulpho; and

D₁ is a dicarboxylic acid amide radical derived from pyridine, thiophene or furane dicarboxylic acid.

2. A disazo dyestuff according to claim 1, wherein V is hydrogen, and
T₁ is methyl, pheyl or 4-methyl-3-sulpho-phenyl.

3. A disazo dyestuff according to claim 1, wherein
V is hydrogen;
Q is pyridinecarboxyl, benzoyl, phenylsulfonyl, or said substituted benzoyl, pyridinecarboxyl or phenylsulfonyl, X₄ is hydrogen, and X₃ is hydrogen, phenyl or said substituted phenyl.

4. A disazo dyestuff according to claim 1, of the formula

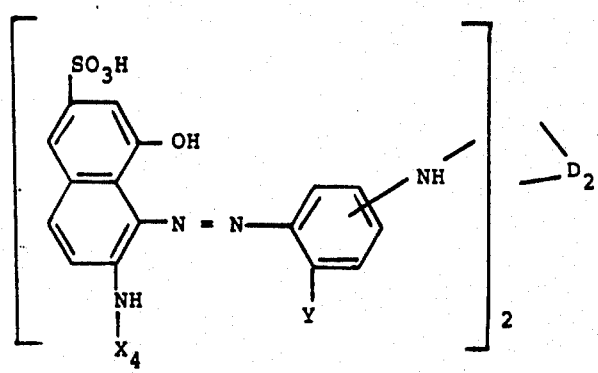

wherein X₄ is hydrogen, phenyl or said substituted phenyl,
Y is —CF₃, —CN, SO₂T₁ or

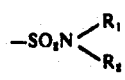

wherein T₁ is methyl, phenyl or 4-methyl-3-sulpho-phenyl,
R₁ is hydrogen, lower alkyl, lower hydroxyalkyl, lower alkoxyalkyl, sulpho lower alkyl phenyl or phenyl substituted by carboxy, sulpho, halo, lower alkyl or lower alkoxy, R₂ is hydrogen, lower alkyl or lower hydroxyalkyl, and D₂ is the dicarbonyl radical of pyridine, thiophene or furane dicarboxylic acid.

5. A disazo dyestuff according to claim 4, wherein R₁ is hydrogen, methyl, ethyl, hydroxyethyl, sulphoethyl, sulphopropyl, phenyl or phenyl substituted by lower alkyl, lower alkoxy, carboxy or sulpho, and R₂ is hydrogen, methyl or hydroxyethyl.

6. A disazo dyestuff according to claim 5, wherein X₃ is hydrogen or a group of the formula

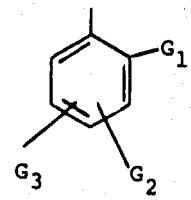

wherein G₁ is hydrogen, methyl or methoxy,
G₂ is chloro, methyl, methoxy, methylsulphonyl or sulpho,
G₃ is hydrogen or methyl and
D₂ is thiophene-2,5-dicarbonyl, pyridine-2,6-dicarbonyl, pyridine-2,4-dicarbonyl, pyridine-2,5-dicarbonyl or pyridine-3,5-dicarbonyl.

7. A disazo dyestuff according to claim 6, wherein T₁ is methyl or 4-methyl-3-sulpho-phenyl, and X₃ is hydrogen or 2,6-dimethylphenyl.

8. A disazo dyestuff according to claim 7, which contains the —NH— group in the p-position to the azo group in the benzene radical.

9. A polyazo dyestyff according to claim 1, of the formula

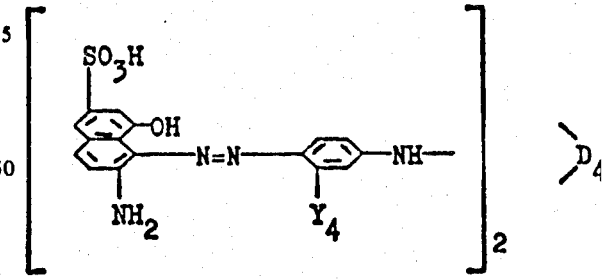

wherein Y₄ denotes

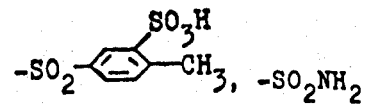

or —SO₂N—CH₂CH₂OH)₂ and D₄ denotes, pyridin 2,6-dicarbonyl.

10. A disazo dyestuff according to claim 1 of the formula

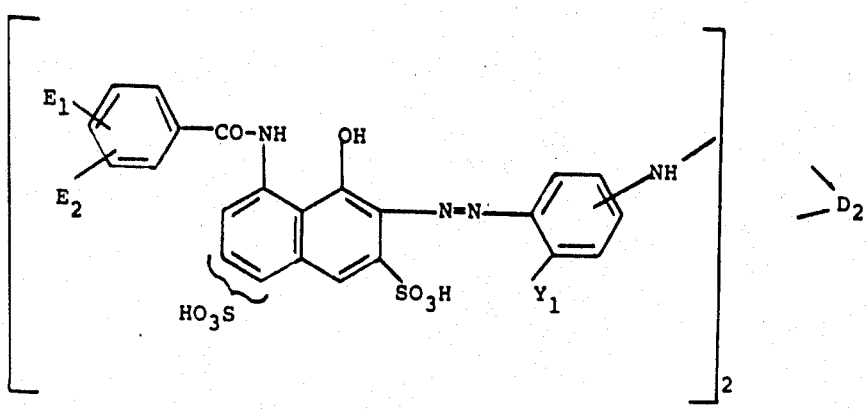

wherein $E_1$ and $E_2$ are in the 3-, 4- or 5-position to the —CO— group and $E_1$ and $E_2$ each are halogen, hydrogen, nitro, cyano, trifluoromethyl, lower alkyl, lower alkoxy or
- —CO — $W_1$,
- —SO$_2$ — $W_2$,
- —NH — CO — $W_3$ or
- —NH — SO$_2$ — $W_4$.

11. A disazo dyestuff according to claim 10 of the formula

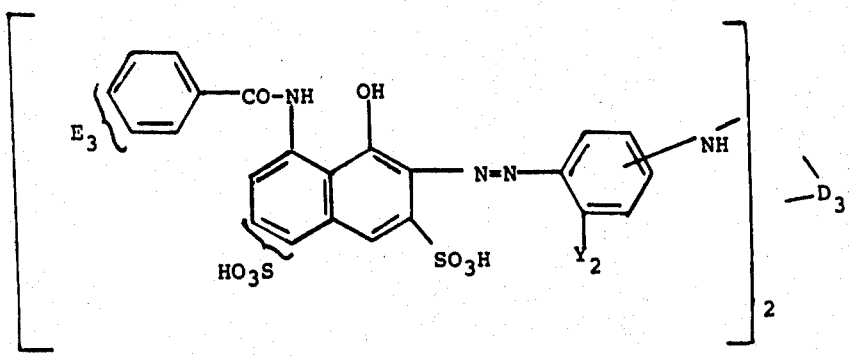

wherein $Y_2$ represents —CF$_3$, —CN, —SO$_2T_3$ or

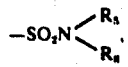

wherein $T_3$ is methyl, phenyl or 4-methyl-3-sulpho-phenyl, $R_5$ is hydrogen, methyl, ethyl, hydroxyethyl, sulphoethyl, sulphopropyl phenyl or phenyl substituted by lower alkyl, lower alkoxy, carboxy or sulpho and
$R_6$ is hydrogen, methyl or hydroxyethyl,
$D_3$ is thiophene-2,5-dicarbonyl, pyridine-2,6-dicarbonyl, pyridine-2,4-dicarbonyl, pyridine-2,5-dicarbonyl or pyridine-3,5-dicarbonyl,
$E_3$ is hydrogen, halo, cyano, trifluoromethyl, lower alkyl, lower alkoxy or —CO—$W_5$, —SO$_2$—$W_6$, —NH—CO—$W_7$ or —NH—SO$_2$—$W_8$,
wherein
$W_5$ represents lower alkyl or lower alkoxy,
$W_6$ represents lower alkyl or —NH$_2$,
$W_7$ represents lower alkyl or lower alkylene—COOH and
$W_8$ represents lower alkyl.

12. A polyazo dyestuff according to claim 11, of the formula

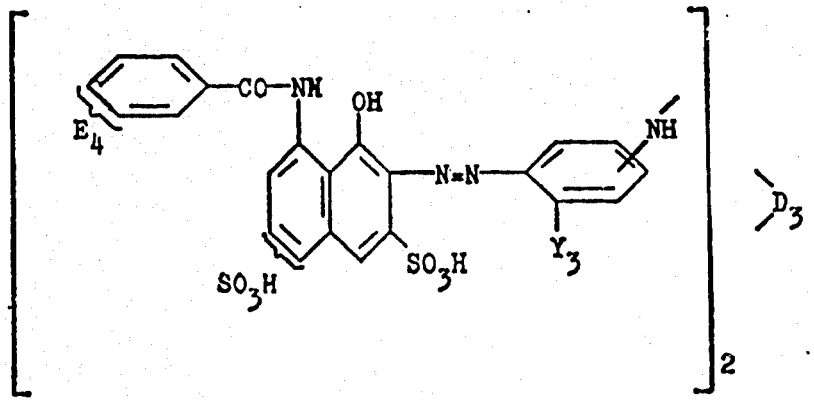

wherein $Y_3$ represents $-CF_3$, $-CN$, $SO_2CH_3$,

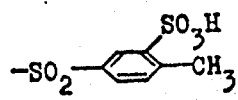

or 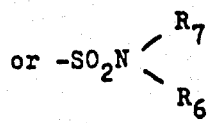

wherein $R_7$ denotes hydrogen, methyl, hydroxyethyl, sulphoethyl or phenyl, $R_6$ denotes hydrogen, methyl or hydroxyethyl and $E_4$ denotes hydrogen, chlorine, cyano, acetyl, carbomethoxy, sulphoamido, methylsulphonyl or methanesulphonylamino.

13. A polyazo dyestuff according to claim 12, of the formula

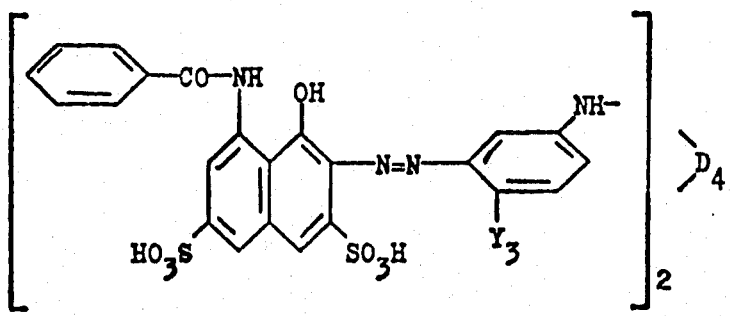

wherein $D_4$ denotes pyridine-2,6-dicarbonyl and $Y_3$ has the meaning indicated in claim 12.

14. A polyazo dyestuff according to claim 12, of the formula

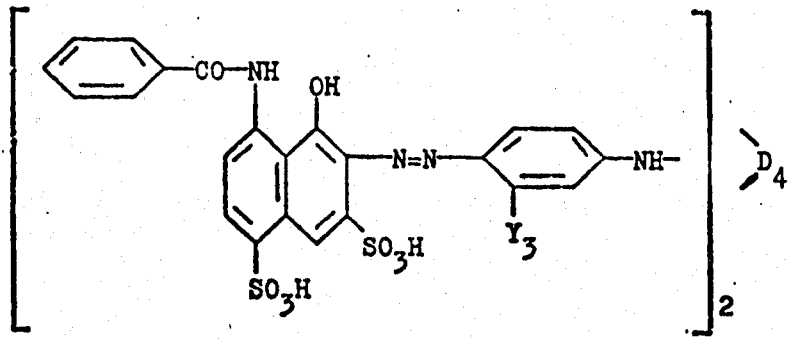

wherein $Y_3$ has the meaning indicated in claim 12 and $D_4$ denotes pyridine-2,6-dicarbonyl.

* * * * *